United States Patent [19]
Kedem et al.

[11] Patent Number: 6,134,643
[45] Date of Patent: Oct. 17, 2000

[54] METHOD AND APPARATUS FOR CACHE LINE PREDICTION AND PREFETCHING USING A PREFETCH CONTROLLER AND BUFFER AND ACCESS HISTORY

[75] Inventors: Gershon Kedem, Chapel Hill, N.C.; Ronny Ronen, Haifa; Adi Yoaz, Talmy-Menache, both of Israel

[73] Assignee: Intel Corporation, Santa Clara, Calif.

[21] Appl. No.: 08/979,575

[22] Filed: Nov. 26, 1997

[51] Int. Cl.⁷ .................................................. G06F 12/08
[52] U.S. Cl. .................... 711/213; 711/204; 711/137; 712/237; 712/239
[58] Field of Search .................... 711/118, 213, 711/133, 134, 137, 204, 159, 113, 100, 3; 712/233, 237, 238, 239, 240

[56] References Cited

U.S. PATENT DOCUMENTS

| | | | |
|---|---|---|---|
| 4,807,110 | 2/1989 | Pomerene et al. | 364/200 |
| 5,093,777 | 3/1992 | Ryan | 395/400 |
| 5,146,578 | 9/1992 | Zangenehpour | 395/425 |
| 5,148,538 | 9/1992 | Celtruda et al. | 395/425 |
| 5,287,487 | 2/1994 | Priem | 395/425 |
| 5,293,609 | 3/1994 | Shih et al. | 395/425 |
| 5,305,389 | 4/1994 | Palmer | 382/1 |
| 5,317,718 | 5/1994 | Jouppi | 395/425 |
| 5,345,560 | 9/1994 | Miura et al. | 395/250 |
| 5,694,568 | 12/1997 | Harrison, III et al. | 711/213 |
| 5,761,706 | 6/1998 | Kessler et al. | 711/118 |
| 5,778,436 | 7/1998 | Kedem et al. | 711/137 |
| 5,822,790 | 10/1998 | Mehrotra | 711/213 |

FOREIGN PATENT DOCUMENTS

WO 93/18459  9/1993  WIPO.

OTHER PUBLICATIONS

Chen et al, "A Performance Study of Software and Hardware Data Prefetching Scheme", 1063–6897/94 IEEE pp. 223–232 (Apr. 1994).

Jouppi, Norman P., "Improving Direct–Mapped Capped Performance by the Addition of a Small Fully–Associate Cache and Prefetch Buffers", CH2887–8/90/000/0364 IEEE pp. 364–373(May 1990).

Krishnan et al., "Optimal Prediction for Prefetching in the Worst Case", DUKE–CS–93–26 pp. 1–24 (Date: unknown).

Joseph et al., "Prefetching Using Markov Predictors", ACM 0–89791–901–7/97/0006 pp. 252–263 (1997).

(List continued on next page.)

*Primary Examiner*—John W. Cabeca
*Assistant Examiner*—Brian R. Peugh
*Attorney, Agent, or Firm*—Blakely, Sokoloff, Taylor & Zafman

[57] ABSTRACT

A microprocessor includes an execution engine, a prediction table cache, and a prefetch controller. The execution engine is adapted to issue a memory request. The memory request includes an identifier corresponding to a row location in an external main memory. The prediction table cache is adapted to store a plurality of entries defining an access history of previously encountered memory requests. The prediction table cache is indexed by the identifier. The prefetch controller is adapted to receive the memory request and generate at least one prefetch candidate based on the memory request and the access history. A method for prefetching data in a microprocessor includes receiving a memory request. The memory request includes an identifier corresponding to a row location in an external main memory. The memory request is compared to an access history of previously encountered memory requests. The access history is indexed by the identifier. At least one prefetch candidate is generated based on the memory request and the access history.

29 Claims, 3 Drawing Sheets

OTHER PUBLICATIONS

Lopriore, Lanfranco, "*Line Fetch/Prefetch in a Stack Cache Memory*", 0141-9331/93/090547-09 Butterworth–Heinemann Ltd., Microprocessors and Microsystems vol. 17, No. 9 (Nov. 1993).

Palmer et al., "*Fido: A Cache That Learns to Fetch*", Proceedings of the 17th International Conference on Very Large Data Bases pp. 255–264 (Sep. 1991).

Eickemeyer et al., "*A Load–Instruction Unit For Pipelined Processor*", IBM J. Res. Develop., vol. 37, No. 4 pp. 547–564 (Jul. 1993).

Vitter et al., "*Optimal Prefetching via Data Compression*", Brown–CS–91–46, pp. 1–19 (Date: unknown).

Alexander et al., "*Distributed Prefetch–Buffer/Cache Design for High Performance*", 0–8186–7237–4/96 IEEE pp. 254–263 (1996).

Pinter, Shlomit S. and Yoaz, Adi, "*Tango: a Hardware–Based Data Prefetching Technique for Superscalar Processors*" (Date: unknown).

METHOD AND APPARATUS FOR CACHE LINE PREDICTION AND PREFETCHING USING A PREFETCH CONTROLLER AND BUFFER AND ACCESS HISTORY

BACKGROUND OF THE INVENTION

1. Field of the Invention

The present invention relates to the field of caching data program instructions for use by a microprocessor. More specifically, the present invention relates to the art of predicting and prefetching cache lines likely to be required by the microprocessor based on prior fetching history.

2. Description of the Related Art

As general purpose processors are getting faster, the speed gap between the microprocessor and the main memory system increases. While the speed of microprocessors generally increases by a factor of 2 every 18 months, DRAM speed improves by only about 5% per year. Moreover, since the DRAM based main memory system is external to the microprocessor, considerable delay is incurred from the time the microprocessor asks for data from memory until the microprocessor receives the first piece of that information so it can continue computing. One technique that helps overcome this latency problem is cache memory. Cache memories are fast memory buffers that store blocks of data and instructions that were recently used by the microprocessor. As microprocessors get faster, they execute larger programs with larger data sets. For large programs with large data sets, caches may be ineffective. That is, large programs executing on computers with large caches could still suffer a large number of cache misses.

Prefetching is a known technique by which the processor anticipates future data accesses and brings the data from memory into a fast buffer before the executing program references the data. If a large portion of the prefetch data is actually used, considerable improvement in performance may be realized due to the decrease in the average memory access time. Known prefetching techniques such as stride calculation and stream buffering may perform adequately for detecting memory accesses at a fixed stride or a combination of a few simultaneous memory access strides, but they perform poorly in situations where the access has a repeating complex memory access pattern. For example, if an application program repeatedly accesses sets of records in a linked list, previous prefetching techniques will not identify the complex access pattern, and the prefetching will not be effective.

The present invention is directed to overcoming, or at least reducing the effects of, one or more of the problems set forth above by providing a prefetching technique capable of identifying complex patterns in memory accesses.

SUMMARY OF THE INVENTION

An aspect of the invention is seen in a microprocessor including an execution engine, a prediction table cache, and a prefetch controller. The execution engine is adapted to issue a memory request. The memory request includes an identifier corresponding to a row location in an external main memory. The prediction table cache is adapted to store a plurality of entries defining an access history of previously encountered memory requests. The prediction table cache is indexed by the identifier. The prefetch controller is adapted to receive the memory request and generate at least one prefetch candidate based on the memory request and the access history.

Another aspect of the invention is seen in a method for prefetching data in a microprocessor. The method includes receiving a memory request. The memory request includes an identifier corresponding to a row location in an external main memory. The memory request is compared to an access history of previously encountered memory requests. The access history is indexed by the identifier. At least one prefetch candidate is generated based on the memory request and the access history.

BRIEF DESCRIPTION OF THE DRAWINGS

Other objects and advantages of the invention will become apparent upon reading the following detailed description and upon reference to the drawings in which.

Figure 1:
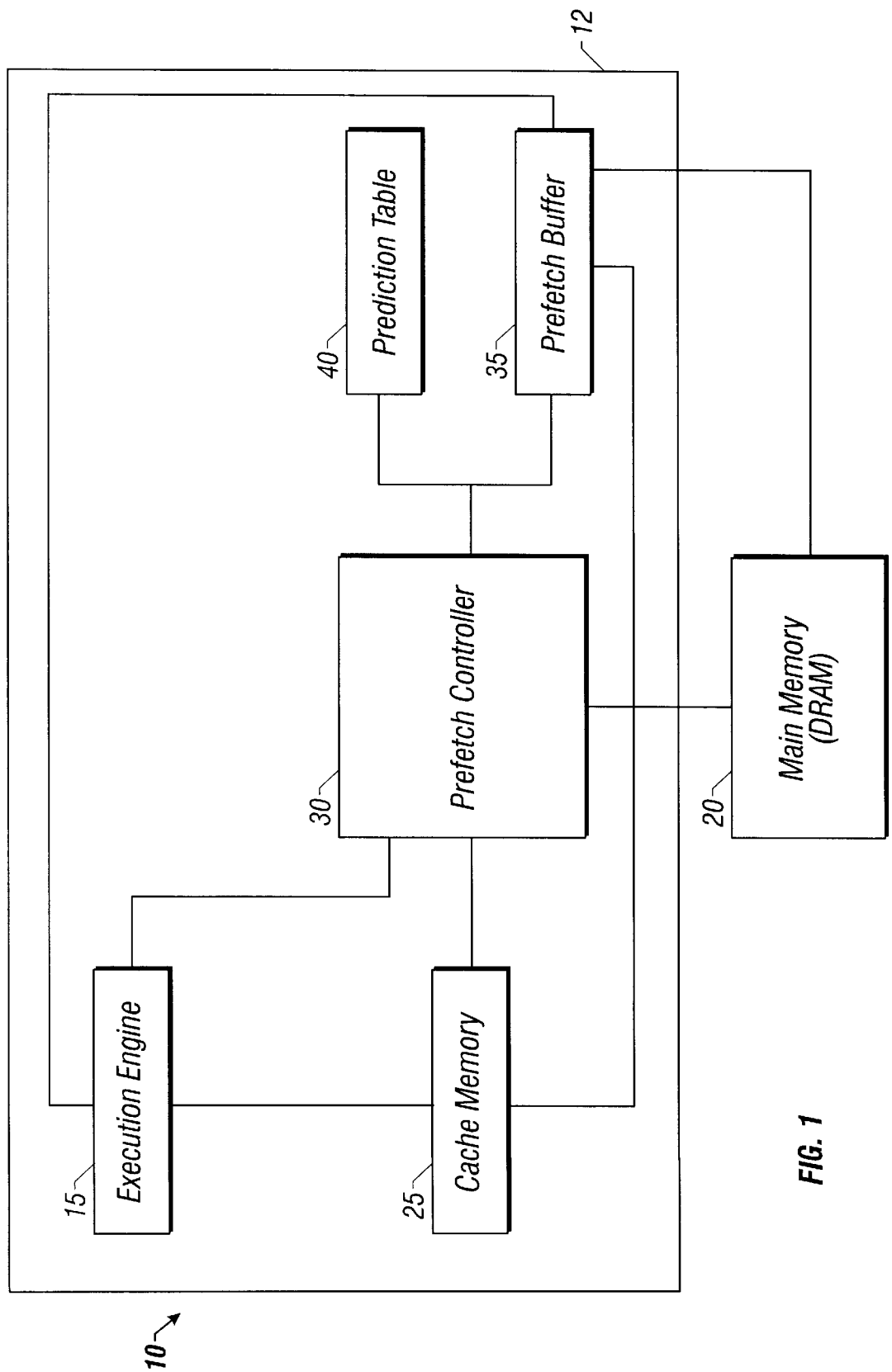
FIG. 1 illustrates a block diagram of a microprocessor system of the present invention capable of predicting and prefetching cache lines.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring to FIG. 1, a microprocessor system 10 of the invention is shown. The microprocessor system 10 includes a microprocessor 12 interfaced with an external memory (DRAM) 20. The microprocessor 12 includes an execution engine 15, a cache memory 25, a prefetch controller 30, a prefetch buffer 35, and a prediction table cache 40. In the illustrated embodiment, the execution engine 15, cache memory 25, prefetch controller 30, prefetch buffer 35, and prediction table cache 40 are contained on a common semiconductor die (not shown). Alternatively, one or more of these items may be located external to the semiconductor die containing the execution engine 15.

During the execution of a computer program, the execution engine 15 generates memory requests when program instructions or data are required. The memory request is tied to an address or group of addresses in the main memory 20. To increase efficiency, recently used instructions or data are stored in the cache memory 25, which is much faster than the external main memory 20. Many computer programs repeatedly access large data structures, generating the same (or similar) sequence of data references. Sequential memory requests are typically related temporally (due to program loops) and spatially (due to the requests for adjacent memory cell values). Because overhead for accessing the DRAM 20 is large, the benefits of caching additional data are significant.

The overhead for accessing the DRAM 20 is large, but the incremental cost of transferring more than one line from the DRAM 20 to the cache memory 25 is relatively small. Access to the DRAM 20 is slow, but accessing additional data on an already open page is fast. The minimum latency of the DRAM 20 access is independent of the size of the data transfer since the requested data is transferred first. Therefore, additional lines may be prefetched from the DRAM 20 without significantly affecting the operation of the execution engine 15. These additional lines are stored in the prefetch buffer 35 for possible use by the execution engine 15.

In general, additional cache lines are prefetched by the prefetch controller 30 when a memory read request misses in the cache memory 25. Since the incremental time required to access different words that are in the same page of the DRAM 20 is small, only lines that reside in the same page are fetched together in the same access. The prediction table cache 40 maintains a prediction table cache (PTC) entry 50 (described in more detail below with respect to FIG. 2) for a page of the DRAM 20. The prediction table cache 40 remembers the cache line access sequence history for a plurality of pages in the DRAM 20. The prefetch controller 30 updates the prediction table cache 40 on every read request issued to the DRAM 20 that misses in the cache memory 25. When a read request misses the cache memory 25, the prediction table cache 40 is consulted, and one or more cache lines that are in the same page of the requested data are generated as prefetch candidates. Each prefetch candidate is checked to see if it is already in the prefetch buffer 35 or the cache memory 25. If the prefetch candidate is in the prefetch buffer 35 the cache memory 25, it is removed as a candidate, otherwise it is prefetched.

If the prediction table cache 40 were sized to hold an entry for each page in the DRAM 20, the array would be prohibitively large. Therefore, the prediction table cache 40 is sized depending on the execution engine 15 architecture to hold PTC entries 50 for a collection of currently active pages. Replacement algorithms for deciding which pages to track are known to one of ordinary skill in the art.

Figure 2:
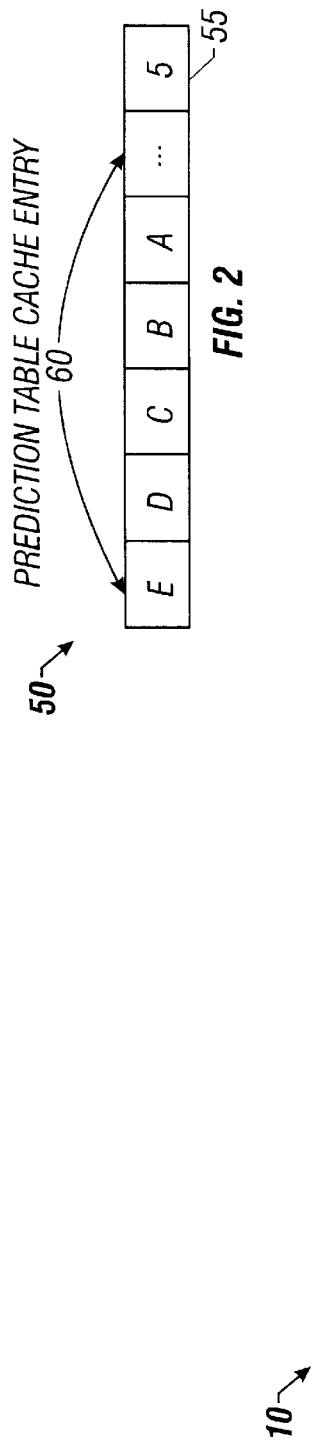
FIG. 2 illustrates the content of a PTC entry in the prediction table cache of FIG. 1.

Referring to FIG. 2, the prediction table cache 40 has one PTC entry 50 for each page in the DRAM 20 being tracked. Each PTC entry 50 is K-bits wide and $2^K$ long, where $2^K$ is the number of different cache lines in each page. For example, if the page is 2KB and the cache lines are 128 bytes long, the PTC entry 50 is 4-bits wide and 16-bits long (e.g., $2^K=16$, K=4).

Each memory access request that misses in the cache memory 25 is used to update a PTC entry 50. Each PTC entry 50 acts as a K-bit wide shift register. The request address is used to compute which PTC entry 50 needs updating, and the new cache line number of that request is shifted into the PTC entry 50. Each PTC entry 50 also has a count field 55 that tells how many valid lines are in that entry. The count field 55 is K+1 bits wide.

In the illustrated embodiment, the prediction table cache 40 is organized into a set associative cache. When a new memory read request that missed in the cache memory 25 arrives, the prediction table cache 40 is checked to see if a PTC entry 50 for the requested page exists. If it does, the PTC entry 50 is updated. If there is no entry in the prediction table cache 40 for the requested page, an appropriate PTC entry 50 (in accordance with the cache 20 replacement policy) is discarded and a new PTC entry 50 for the page is created. The count field 55 of the PTC entry 50 is set to 1, and the request line number is shifted into the leftmost slot 60 in the PTC entry 50.

The operation of the prediction table cache 40 is best illustrated via an example. For illustrative purposes, assume the memory system has a 32-bit physical address space, the DRAM 20 has 2KB pages, and the cache memory 25 has 128-byte cache lines. The lowest 7 bits (bit0–bit6) of the address are the cache line byte offset. The next four bits (bit7–bit10) are the page line number, the rest of the bits (bit11–bit32) are the page number. Assume a sequence of references: A, B, C, D, E of memory read requests all to the same page, i.e., page N. Every time a new memory request hits page N, the prediction table cache 40 is updated. The page line number of the request is shifted into the leftmost slot 60 of the PTC entry 50. FIG. 2 illustrates the PTC entry 50 for page N after request E arrives. Note that the count field 55 for the PTC entry 50 is 5.

Figure 3:
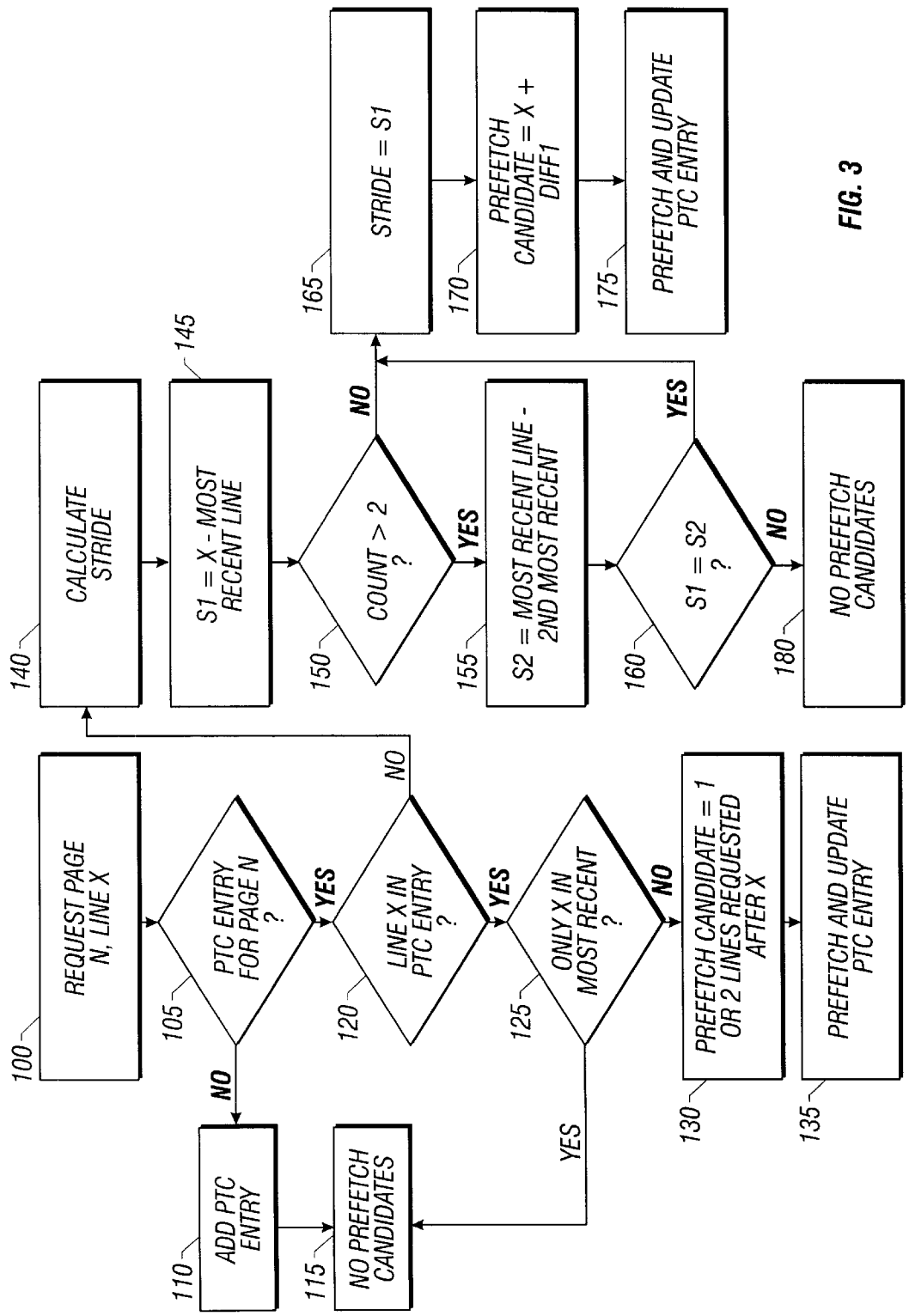
FIG. 3 illustrates a flow diagram of a method to generate prefetch candidates.

The prediction table cache 40 is used to generate one or more prefetch candidates using the flow logic diagram shown in FIG. 3. If the DRAM page requested in block 100 does not have a corresponding PTC entry 50, as determined in block 105, a new PTC entry 50 is allocated in block 110, but no prefetch candidates are generated, as seen in block 115. If the entry is in the prediction table cache 40, the PTC entry 50 is searched for the most recent occurrence of the requested line number in block 120 (leftmost occurrence other than in the most recent slot 60). If the only occurrence of the requested line number is in the most recent slot 60 (i.e., the most recent memory request), as determined in block 125, no history is present, and therefore, no prefetch candidates are generated, as seen in block 115.

In block 130, the entries in the slots 60 to the left of the most recent occurrence (later accesses) are used as predictions of which cache lines to prefetch. The candidates are prefetched and the PTC entry 50 is updated in block 135. If the requested line is not in one of the slots 60 in the PTC entry 50, stride calculation is used to generate prefetch candidates, as seen in block 140.

The difference between the current line number and the previous line (the rightmost in the PTC entry 50) is computed in block 145. If the PTC entry 50 has two or more line numbers in the list (count>1), as determined in block 150, the difference between the two previous requests is calculated in block 155, and the two differences are compared in block 160. If the differences are the same, the difference is used as a stride in block 165 to extrapolate from the current request to select one or more candidate cache lines for prefetching in block 170. The candidates are prefetched and the PTC entry 50 is updated in block 175. If the difference is not the same, no confirmed stride is present, and no prefetch candidate is generated, as seen in block 180.

If the PTC entry 50 has only one line (i.e., count=1 in block 150), the difference with the previous line and the current line is used as a stride in block 165, and one or more candidates for prefetching are generated based on the calculated stride in block 170. The candidates are prefetched and the PTC entry 50 is updated in block 175.

For example, using the sequence of accesses A, B, C, D, E described above, if the next request is for line C, the lines D and E will be used as prefetch candidates. If a memory request for line F is received, a check of the PTC entry 50 will yield no previous requests. The difference between the current line and the most recent line (F–E) will be compared to the difference between the two previous requests (E–D). If the two differences match, it indicates a possible pattern in the fetching history (i.e., confirmed stride), and the difference (S=F–E) will be used as a stride to compute the prefetch candidate. That is, (F+S) will be the prefetch candidate.

The prefetch controller 30 may be configured to implement various prefetching strategies. An example of a conservative prefetching strategy is to prefetch on compulsory DRAM 20 accesses only (i.e., data not present in either cache memory 25 or prefetch buffer 35). Another approach is to use a speculative strategy where extra cache lines are speculatively prefetched when the requested cache line is already in the prefetch buffer 35. Using the speculative strategy, an additional cache line may be prefetched when a DRAM access is necessary and when the requested data is already in the prefetch buffer 35. Also, the prefetch controller 30 may prefetch one additional cache line when a DRAM access is needed and prefetch as many as two additional cache lines when the requested data is already in the prefetch buffer 35.

It is contemplated that other variations on the method for identifying prefetch candidates shown in FIG. 3 may be determined using the fetching history stored in the prediction table cache 40 based on the disclosure herein. Specifically, prefetching may be conducted in some of the situations where no prefetch candidate was identified in FIG. 3. The number of prefetch candidates identified may also be varied depending on the specific application of the invention.

The embodiment of FIG. 1, shows a separate prefetch buffer 35 for storing prefetch candidates. When the execution engine 15 issues a memory request, the requested address is simultaneously supplied to both the cache memory 25 and the prefetch buffer 35. If the memory request misses in the cache memory 25 and hits in the prefetch buffer 35, the requested line is transferred directly to the execution engine 15. In parallel, the prefetch controller 30 copies the requested line into the cache 25, and updates the prediction table cache 40. The prefetch controller 30 generates prefetch candidates as described above and transfers the prefetch candidates from the main memory 20 to the prefetch buffer 35. Because the requested line has already been supplied to the execution engine 15, prefetching additional lines has no negative impact on overall memory access latency. If the execution engine 15 then requests one of the prefetched lines, it will be located in the prefetch buffer 35, negating the need to access the DRAM 20, and thus, improving the average memory access time of the microprocessor system 10.

Figure 4:
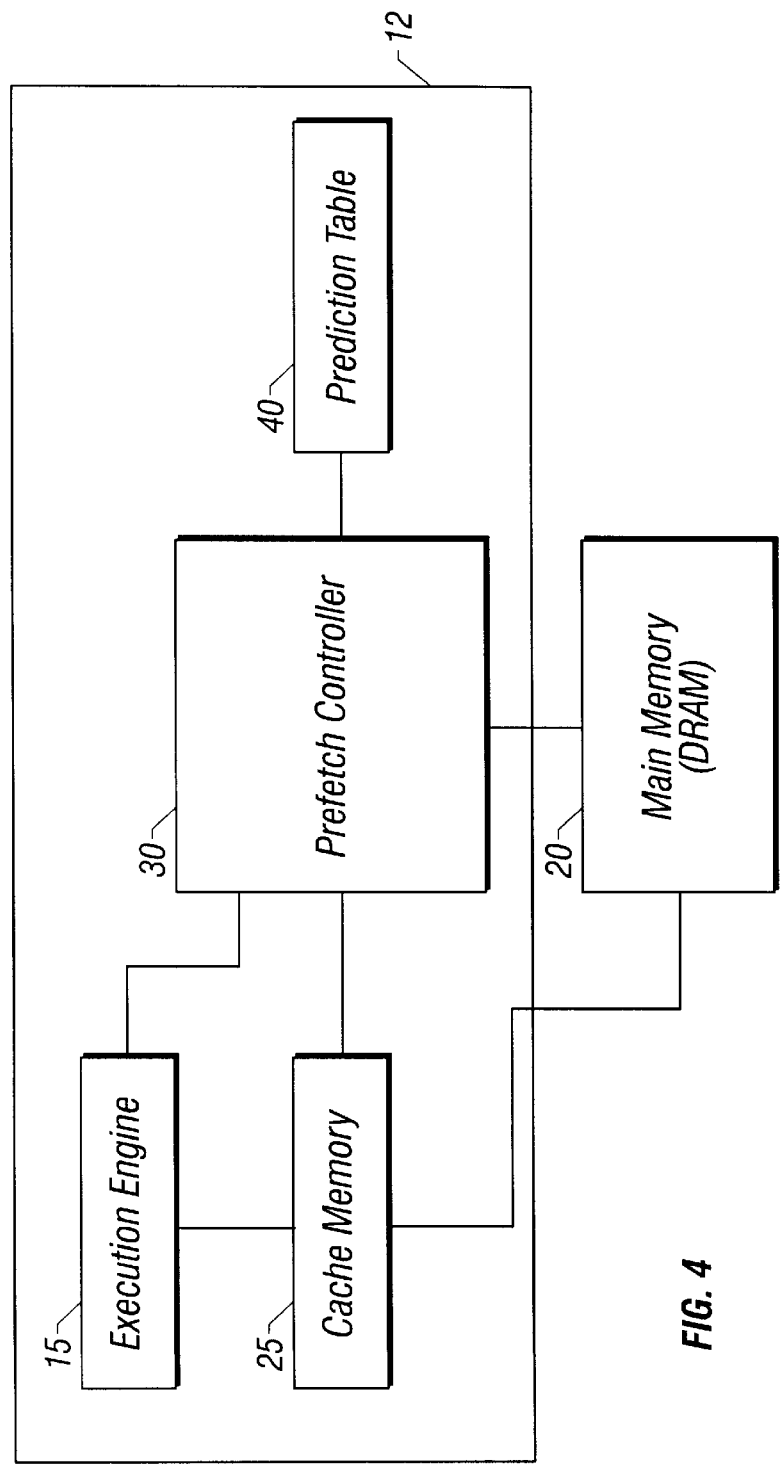
FIG. 4 illustrates a block diagram of an alternative embodiment of the microprocessor system of FIG. 1.

In an alternative embodiment of the invention shown in FIG. 4, the prefetch controller 30 does not use a prefetch buffer 35, but rather, writes prefetch candidates directly to the cache memory 25. The choice between using a separate prefetch buffer 35 and integrating the prefetch candidates into the cache memory 25 depends on specific design considerations, such as the size of the cache memory 25 and other microarchitecture constraints. Also, if prefetch candidates are written directly to the cache memory 25, the cache memory 25 may become polluted with lines that are never requested by the execution engine 15.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A microprocessor, comprising:

an execution engine for issuing a memory request, the memory request including an identifier corresponding to a row location in an external main memory;

a prediction table cache for storing a plurality of entries defining an access history of previously encountered memory requests, the prediction table cache being indexed by the identifier, the prediction table cache including first and second members of a list of previously encountered memory requests; and a prefetch controller coupled to the execution engine and the prediction table cache for receiving the memory request, determining if the memory request corresponds to the first member, and identifying at least one prefetch candidate based on the second member;

wherein the memory request includes an address having a plurality of bits, a first subset of the bits defines a page number, and the identifier includes the page number.

2. The microprocessor of claim 1, wherein a second plurality of the bits in the address defines a line number and the prediction table cache is for storing the line number in the entry corresponding to the page number.

3. The microprocessor of claim 1, wherein the prefetch controller is further for identifying a plurality of prefetch candidates based on a plurality of members of the list stored after the first member.

4. The microprocessor of claim 1, wherein the prefetch controller is further for calculating a stride based on the memory request and the list and identifying the prefetch candidate based on the stride.

5. The microprocessor of claim 1, further comprising:

a prefetch buffer for storing the prefetch candidate from the prefetch controller.

6. The microprocessor of claim 1, further comprising:

a cache memory for storing the prefetch candidate from the prefetch controller.

7. The microprocessor of claim 1, further comprising:

a cache memory for storing a plurality of cache lines and for receiving the memory request from the execution engine and for supplying a first cache line corresponding to the memory request to the execution engine.

8. The microprocessor of claim 1, further comprising:

a prefetch buffer for storing a plurality of prefetch lines, wherein the prefetch controller is further for supplying a first prefetch line corresponding to the memory request to the execution engine.

9. The microprocessor of claim 1, further comprising:

a cache memory for storing a plurality of cache lines, for receiving the memory request from the execution engine, and for generating a cache miss if the memory request does not correspond to one of the plurality of cache lines; and a prefetch buffer for storing a plurality of prefetch lines, wherein the prefetch controller is further for supplying a first prefetch line corresponding to the memory request to the execution engine if the cache memory generates the cache miss.

10. The microprocessor of claim 9, wherein the prefetch controller is further for storing the first prefetch line as one of the cache lines in the cache memory.

11. A microprocessor system, comprising:
a main memory organized by rows; and
a microprocessor, the microprocessor including:
an execution engine for issuing a memory request, the memory request including an identifier corresponding to a row location in the main memory;
a prediction table cache for storing a plurality of entries defining an access history of previously encountered memory requests, the prediction table cache being indexed by the identifier, the prediction table cache including first and second members of a list of previously encountered memory requests;
a prefetch buffer coupled to the execution engine and the prediction table cache for storing a plurality of prefetch lines; and
a prefetch controller coupled to the execution engine, the prefetch buffer and the prediction table cache for receiving the memory request, determining if the memory request corresponds to the first member, and identifying at least one prefetch candidate based on the second member, locating the prefetch candidate in the main memory, and storing the prefetch candidate in the prefetch buffer;
wherein the memory request includes an address having a plurality of bits, a first subset of the bits defines a page number, and the identifier includes the page number.

12. The microprocessor system of claim 11, wherein the prefetch buffer comprises a cache memory for storing a plurality of cache lines.

13. The microprocessor system of claim 11, wherein a second plurality of the bits in the address defines a line number within a page stored in the main memory corresponding to the page number and the prediction table cache is for storing the line number in the entry corresponding to the page number.

14. The microprocessor system of claim 11, wherein the prefetch controller is further for identifying a plurality of prefetch candidates based on a plurality of members of the list stored after the first member.

15. The microprocessor system of claim 11, wherein the prefetch controller is further for calculating a stride based on the memory request and the list and for identifying the prefetch candidate based on the stride.

16. The microprocessor system of claim 11, further comprising:
a cache memory for storing a plurality of cache lines and for receiving the memory request from the execution engine and for supplying a first cache line corresponding to the memory request to the execution engine.

17. The microprocessor system of claim 11, wherein the prefetch controller is further for supplying a first prefetch line corresponding to the memory request to the execution engine.

18. The microprocessor system of claim 11, further comprising:
a cache memory for storing a plurality of cache lines, for receiving the memory request from the execution engine for generating a cache miss if the memory request does not correspond to one of the plurality of cache lines, and the prefetch controller is further for supplying a first prefetch line corresponding to the memory request if the cache memory generates the cache miss.

19. The microprocessor system of claim 18, wherein the prefetch controller is further for storing the first prefetch line as one of the cache lines in the cache memory.

20. A method for prefetching data in a microprocessor, comprising:
receiving a memory request, the memory request including an identifier corresponding to a row location in an external main memory;
comparing the memory request to a list of previously encountered memory requests, the list being indexed by the identifier;
determining if the memory request corresponds to a first member of the list; and
identifying at least one prefetch candidate based on a second member of the list stored after the first member;
wherein the memory request includes an address having a plurality of bits,
a first subset of the bits defines a page number, and the identifier includes the page number.

21. The method of claim 20, further comprising storing the prefetch candidate in a prefetch buffer.

22. The method of claim 20, further comprising storing the prefetch candidate in a cache memory.

23. The method of claim 20, further comprising identifying a plurality of prefetch candidates based on a plurality of the members of the list stored after the first member.

24. The method of claim 20, wherein the comparing includes:
comparing the memory request to a list of the previously encountered memory requests;
calculating a first stride based on the memory request and the list; and
identifying the prefetch candidate based on the stride.

25. The method of claim 20, the memory request including a requested line number, wherein calculating a first stride includes subtracting a line number of the memory request from a most recent member of the list to generate the first stride.

26. The method of claim 25, wherein calculating the first stride further includes subtracting the line number of the most recent member of the list from a line number of a second most recent member of the list to generate a second stride.

27. The method of claim 26, wherein calculating a stride further includes:
comparing the first stride to the second stride; and
identifying the prefetch candidate based on the first stride if the first stride matches the second stride.

28. The method of claim 20, further comprising retrieving data corresponding to the memory request from a main memory.

29. A method for prefetching data in a microprocessor, comprising:
receiving a memory request, the memory request including an identifier corresponding to a row location in an external main memory;
determining if data corresponding to the memory request is contained within a cache memory;
generating a cache miss if data corresponding to the memory request is not contained within the cache memory;
determining if data corresponding to the memory request is contained within a prefetch buffer in response to the cache miss;

generating a prefetch miss if data corresponding to the memory request is not contained within the prefetch buffer;

retrieving data corresponding to the memory request from a main memory in response to the prefetch miss;

comparing the memory request to a list of previously encountered memory requests, the list being indexed by the identifier;

determining if the memory request corresponds to a first member of the list;

identifying at least one prefetch candidate based on a second member of the list stored after the first member; and storing the prefetch candidate in at least one of the prefetch buffer and the cache memory;

wherein the memory request includes an address having a plurality of bits,
a first subset of the bits defines a page number, and the identifier includes the page number.

* * * * *

UNITED STATES PATENT AND TRADEMARK OFFICE
CERTIFICATE OF CORRECTION

PATENT NO. : 6,134,643
DATED : October 17, 2000
INVENTOR(S) : Kedem et al.

It is certified that error appears in the above-identified patent and that said Letters Patent is hereby corrected as shown below:

Column 4,
Line 6, after "cache" delete "20".

Signed and Sealed this

Nineteenth Day of February, 2002

Attest:

Attesting Officer

JAMES E. ROGAN
Director of the United States Patent and Trademark Office